US009538387B2

United States Patent
Athley et al.

(10) Patent No.: US 9,538,387 B2
(45) Date of Patent: Jan. 3, 2017

(54) RADIO RESOURCE ASSIGNMENT COORDINATION IN SUPERDENSE NETWORKS

(71) Applicant: Telefonaktiebolaget L M Ericsson (publ), Stockholm (SE)

(72) Inventors: Fredrik Athley, Kullavik (SE); Martin Johansson, Mölndal (SE); Sven Petersson, Sävedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 200 days.

(21) Appl. No.: 14/037,823

(22) Filed: Sep. 26, 2013

(65) Prior Publication Data

US 2014/0092835 A1    Apr. 3, 2014

Related U.S. Application Data

(60) Provisional application No. 61/706,946, filed on Sep. 28, 2012.

(51) Int. Cl.
| | |
|---|---|
| *H04W 16/10* | (2009.01) |
| *H04W 72/08* | (2009.01) |
| *H04W 72/04* | (2009.01) |
| *H04W 16/12* | (2009.01) |
| *H04W 24/02* | (2009.01) |
| *H04B 7/06* | (2006.01) |

(52) U.S. Cl.
CPC ............ *H04W 16/10* (2013.01); *H04W 16/12* (2013.01); *H04W 24/02* (2013.01); *H04W 72/04* (2013.01); *H04W 72/082* (2013.01); *H04B 7/0617* (2013.01)

(58) Field of Classification Search
CPC .... H04W 16/10; H04W 72/082; H04W 72/04; H04W 16/12; H04W 24/02; H04B 7/0617
See application file for complete search history.

(56) References Cited

U.S. PATENT DOCUMENTS

| 8,805,373 | B2 * | 8/2014 | Chayat | .................. | H04W 16/12 |
| | | | | | 370/331 |
| 2008/0080629 | A1 * | 4/2008 | Munzner | ....................... | 375/260 |
| 2009/0047971 | A1 * | 2/2009 | Fu | ................................. | 455/450 |
| 2010/0041408 | A1 * | 2/2010 | Caire et al. | .................. | 455/446 |
| 2011/0205929 | A1 * | 8/2011 | Quek et al. | ................... | 370/252 |

(Continued)

*Primary Examiner* — Kwang B Yao
*Assistant Examiner* — Moo Jeong
(74) *Attorney, Agent, or Firm* — Coats & Bennett, P.L.L.C.

(57) ABSTRACT

A network controller as well as a method in a network controller for coordinating resource assignments to radio access points of a superdense, SDN, network is provided. The method comprises identifying a set of radio access points in the SDN network whose respective radio resource assignment is to be independently coordinated. The method also comprises obtaining interference information indicative of the extent to which radio transmissions to or from different radio access points in the set would interfere with one another absent radio resource assignment coordination. The method then forms subsets of the radio access points in the set based on this obtained interference information. The method also assigns different subsets of radio resources to the different subsets of the radio access points, and reports assignment information to the radio access points in the set, indicating the assignment of radio resources.

25 Claims, 4 Drawing Sheets

Dividing a network into groups with natural isolation

(56) References Cited

U.S. PATENT DOCUMENTS

| | | | |
|---|---|---|---|
| 2011/0222525 A1* | 9/2011 | Kishigami et al. | 370/343 |
| 2013/0121431 A1* | 5/2013 | Sun et al. | 375/267 |
| 2013/0322235 A1* | 12/2013 | Khoryaev | H04W 24/10 370/229 |
| 2015/0036590 A1* | 2/2015 | Lahetkangas et al. | H04L 1/0003 370/328 |

* cited by examiner

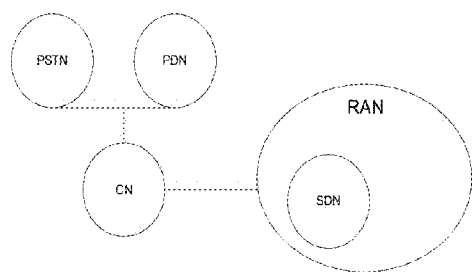
Figure 3
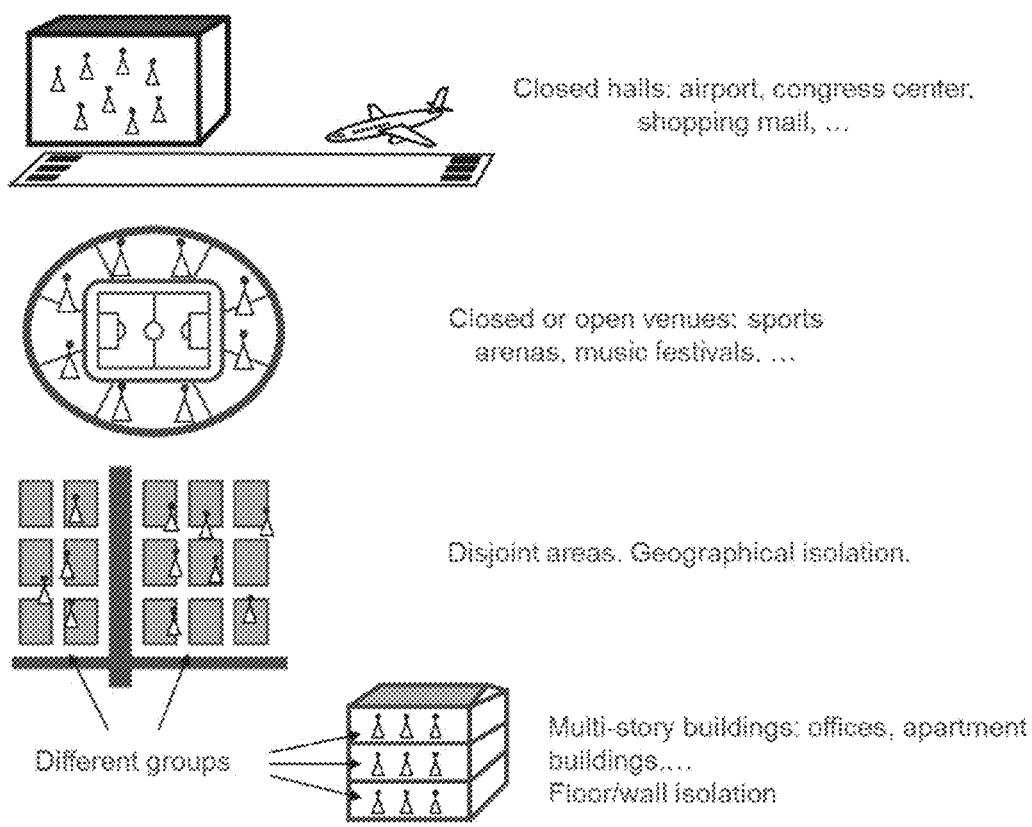
Figure 4: Dividing a network into groups with natural isolation

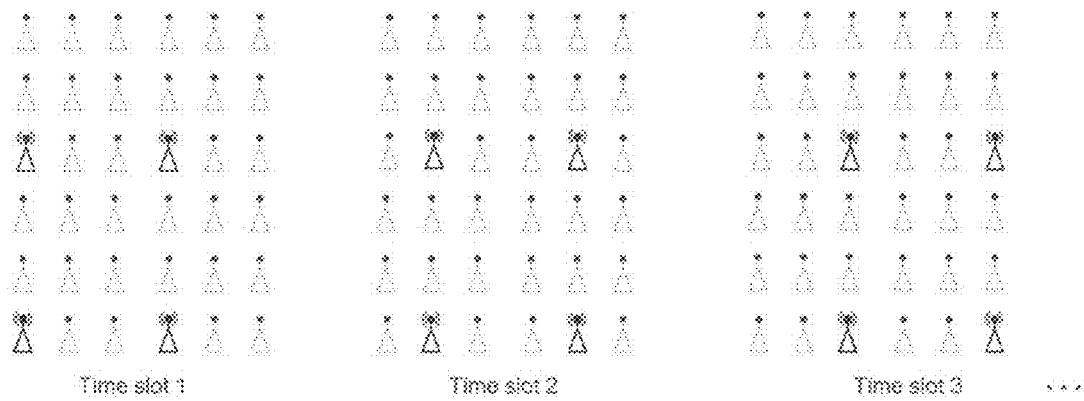
Figure 5: Illustration of subsets active in different time slots
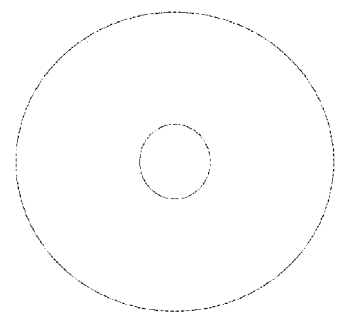
Figure 6

RADIO RESOURCE ASSIGNMENT COORDINATION IN SUPERDENSE NETWORKS

RELATED APPLICATIONS

This application claims the benefit of U.S. Provisional Application No. 61/706,946, filed 28 Sep. 2012, the entire contents of which is incorporated by reference herein.

TECHNICAL FIELD

Embodiments herein relate generally to a network controller node and a method in the network controller node, and to a wireless communication system and a computer readable storage medium. More particularly the embodiments herein relate to assigning of resources to access points in a superdense network.

BACKGROUND

Wireless devices for communication such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks (CNs), comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", Base Transceiver Station (BTS), or AP (Access Point) or radio AP, depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The APs or base stations communicate over the air interface operating on radio frequencies with the terminals within range of the APs or base stations. In the context of this disclosure, the expression Downlink (DL) is used for the transmission path from the radio AP to the wireless terminal. The expression Uplink (UL) is used for the transmission path in the opposite direction i.e. from the wireless terminal to the radio AP.

Superdense networks (SDNs) are extremely dense deployments of radio access points (radio APs) for wireless communication with inter-site distances in the order of, or even less than, tens of meters. With such a dense deployment the number of simultaneously active wireless terminals per radio AP is expected to be low. Therefore, SDNs are assumed to be noise-limited as opposed to traditional cellular networks which are typically interference-limited in scenarios with high traffic density. Noise-limitation is a desired property since it enables high link bit rate and simplifies radio resource management, coordination, and possibly also radio receiver implementations. SDNs are sometimes also referred to as ultradense networks. (UDNs).

SUMMARY

One or more embodiments herein recognize that, although SDNs are assumed to be noise-limited, this may not always be the case. For example, in very dense SDN deployments the interference level can be high locally in time and/or space since wireless terminals will have low path loss to multiple radio APs due to the short inter-site distances and high probability of line-of-sight (LoS). If more than one radio AP is transmitting at the same time in an SDN, they will also act as strong interferers.

Some approaches to addressing this problem might employ inter-cell interference coordination (ICIC) techniques so that the SDN operates in a noise-limited regime. Another approach to reducing the average interference can be to perform high-gain beamforming since this will reduce the probability that a transmitting radio AP will create interference to other active wireless terminals. Yet another approach can be to densify the network further since this improves the path gain between radio APs and wireless terminals as well as lowers the activity of individual nodes thereby decreasing overall interference. Drawbacks with these approaches are that they would require more hardware and/or are complex control systems. One or more embodiments herein however advantageously take an SDN from an interference-limited regime to a noise-limited regime with minimal hardware and complexity requirements. Indeed, compared to alternative solutions, one or more embodiments herein are low cost, have the same node density, have the same complexity per node, and are simple because they require a minimum of control signaling.

More particularly, embodiments herein include a method implemented by a network controller for coordinating assignment of radio resources to radio access points in a superdense network. As shown in FIG. 1, for example, the method includes identifying a set of radio access points in the superdense network whose radio resource assignment is to be independently coordinated (Block 100). Broadly, independent coordination in this regard means that the network controller coordinates assigning radio resources to radio access points in the set without regard to the assignment of radio resources to any radio access points outside the set.

Regardless, the method also includes obtaining interference information indicative of the extent to which radio transmissions to or from different radio access points in the set would interfere with one another absent radio resource assignment coordination (Block 110). In some embodiments, this interference information comprises permissible set information from terminals broadly pertaining to whether or the extent to which any given radio access point is included in the same permissible set as a different radio access point. A permissible set as used herein is a list maintained by each wireless terminal containing the radio APs that are able to establish a link to the terminal with sufficient quality (e.g., a quality above a defined threshold). In other embodiments, the interference information comprises path gain information more specifically pertaining to the path gains between different wireless terminals and radio access points in the superdense network. Alternatively or additionally, the interference information in other embodiments comprises positioning information pertaining to the geographic position of the radio access points in the superdense network, the geographic position of physical objects (e.g., buildings) in the superdense network that provide natural isolation, or the like. In a general sense, then, the interference information broadly indicates the extent to which radio transmissions to or from different radio access points would "naturally" interfere with one another, e.g., given the radio access points' positions relative to one another, any physical objects such as buildings between the radio access points, etc.

Irrespective of the particular type of interference information obtained, the method further entails forming (i.e., creating or otherwise determining) different subsets of the radio access points in the set, based on the obtained interference information (Block 120). More specifically, the different subsets are formed such that, according to the interference information, radio transmissions to or from radio access points in the same subset would interfere with one another to a lesser extent and radio transmissions to or from radio access points in different subsets would interfere with one another to a larger extent. In other words, radio access points in the same subset would naturally interfere with one another to a lesser extent (or, conversely, the points would be naturally isolated from one another to a greater extent). By contrast, radio access points in different subsets would naturally interfere with one another to a greater extent (or, conversely, the points would be naturally isolated from one another to a lesser extent).

After subset formation, the method includes assigning different subsets of radio resources to the different subsets of the radio access points, to minimize or at least reduce the extent to which radio transmissions to or from radio access points in different subsets will interfere with one another (Block 130). In some embodiments, radio resources include time resources, frequency resources, or both. Broadly, reducing the extent of interference through radio resource assignment in this way amounts to artificially increasing the isolation between the radio access points in different subsets. In this sense, then, the method in some embodiments forms the different subsets to exploit as much natural isolation as possible between radio access points belonging to the same subset and intelligently assigns radio resources to those subsets to impose as much artificial isolation as possible between radio access points belonging to different subsets.

In any event, the method finally includes sending assignment information towards the radio access points in the set indicating this assignment of radio resources (Block 140). Sending of assignment information in some embodiments, for example, involves transmitting the assignment information as control signaling.

Although the above embodiments are focused on a single set (e.g., group or cluster) of radio access points, other embodiments herein involve multiple sets, where the above method is performed independently for each set. In this regard, identifying any given set entails distinguishing the set of radio access points from a different set of radio access points in the superdense network. Radio resource assignments to radio access points in one set is to be coordinated independently from radio resource assignment to radio access points in another set.

Expanding upon these other embodiments, therefore, the method performed by the network controller further includes obtaining interference information indicative of the extent to which radio transmissions to or from radio access points in multiple sets would interfere with one another absent radio resource assignment coordination. Moreover, the method entails determining, based on the obtained interference information, that the extent of interference between radio transmissions to or from any given radio access point in one set and radio transmissions to or from any given radio access point in a different set would be below a defined threshold. Such determination amounts to identifying that the radio access points in different sets are substantially naturally isolated from one another, meaning that no coordination need take place across the different sets with regard to radio resource assignment.

In some embodiments, the subsets herein are mutually exclusive, meaning that they are disjoint from one another. That is, a radio access point is not included in more than one subset. In other embodiments, however, the subsets herein are not disjoint, meaning that at least one radio access point is included in more than one subset. In this case, for example, consider a situation where a radio AP A could be associated with one or more "secondary subsets" in addition to a "primary subset" when the activity (traffic load) on radio APs in the "secondary subset(s)" is low, particularly for radio APs close to radio AP A, or when a terminal has high traffic requirements. For instance, this could be advantageous for a terminal which has only one candidate AP with good link performance in its permissible set. Allowing an AP to be associated with a secondary subset will increase the risk of interference, but in low-load situations this may be a non-issue.

In some embodiments, the network controller dynamically adapts one or more criteria based on which the subsets are formed. In one embodiment, for example, these one or more criteria include the extent to which radio transmissions to or from radio access points in the same subset are permitted to (naturally) interfere with one another. In one example, this permitted extent is governed by one or more thresholds indicative of or otherwise associated with interference, meaning that dynamic adaptations involves adaptation of these one or more thresholds. In this or other embodiments, the one or more criteria reflect or otherwise affect the geographic density of the radio access points included in the same subset. For example, dynamically adapting the one or more criteria to permit a greater extent of interference between radio access points in the same subset means that the geographic density of the radio access points in the subset will be increased. Alternatively or additionally, this means that the number of radio access points in the subset will be increased (i.e., the size of the subset will be increased). In some embodiments, as one example, such dynamic adaptation is performed based on the traffic demand in the superdense network. For instance, responsive to increased traffic demand, the network controller dynamically adjusts the one or more criteria to permit a greater extent of interference between radio access points in the same subset (as compared to before the adjustment). Conversely, responsive to decreased traffic demand, the network controller dynamically adjusts the one or more criteria to permit a lesser extent of interference between radio access points in the same subset. In embodiments where the radio resources assigned include time resources, permitting a greater extent of interference between radio access points in any given subset means that a greater number of access points will be available for serving traffic demand at any given time, albeit at the potential expense of increased interference between access points belonging to the same subset. Conversely, permitting a lesser extent of interference between radio access points in any given subset means that fewer access points are available for serving traffic demand at any given time, but that interference is decreased between access points belonging to the same subset.

In view of the above modifications and variations, those skilled in the art will appreciate that FIG. 2 illustrates a network controller configured to perform the method of FIG. 1. In this regard, the network controller in some embodiments is a radio network controller, is a certain one of the radio access points designated as a master or controller over other access points, or is some other network node in the superdense network. Regardless, as shown in FIG. 2, the network controller includes one or more communication interfaces configured to communicatively couple the controller to radio access points in the superdense network. The network controller also includes one or more processing circuits configured to implement the method of FIG. 1. As shown, though, the processing circuits include a set identifying circuit configured to perform the identifying step of FIG. 1, an interference information obtaining circuit configured to perform the obtaining step of FIG. 1, and a subset forming circuit configured to perform the forming step of FIG. 1. Further, the one or more processing circuits as shown include an assignment circuit configured to perform the assigning step of FIG. 1, as well as a reporting circuit configured to perform the sending step of FIG. 1.

Those skilled in the art will of course appreciate that the above figure is simply an example, and that the depicted circuits may be realized, implemented, or otherwise configured within the node, based upon the execution of computer program instructions stored in memory or within another computer readable medium in the entity.

Putting the network controller and the SDN in context, FIG. 3 illustrates a wireless communication system according to one or more embodiments. As shown, a core network (CN) communicatively couples a radio access network (RAN) to one or more external networks, such as a public switched telephone network (PSTN), a packet data network (PDN) such as the Internet, or the like. The RAN includes the SDN as described above. The RAN in some embodiments also includes other radio access network deployments, such as macro access point deployments, pico access point deployments, etc. Regardless, the network controller herein in some embodiments is included in the CN. In other embodiments, the network controller herein is included in the RAN, e.g., in the SDN itself.

Also, FIG. 6 illustrates a computer readable storage medium according to some embodiments. The medium having stored thereon a computer program comprising computer readable code which, when run on at least one processing circuit of a network controller, causes the network controller to perform the method of FIG. 1.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Examples of embodiments herein are described in more detail with reference to attached drawings in which:

FIG. 3 is a schematic block diagram depicting embodiments of a wireless communication system.

FIGS. 4, 5 schematically depict respective embodiments of a set of radio access points divided into subsets having resource assignments allowing activity in different time slots.

FIG. 6 schematically illustrates a computer readable storage medium.

DETAILED DESCRIPTION

Figure 1:
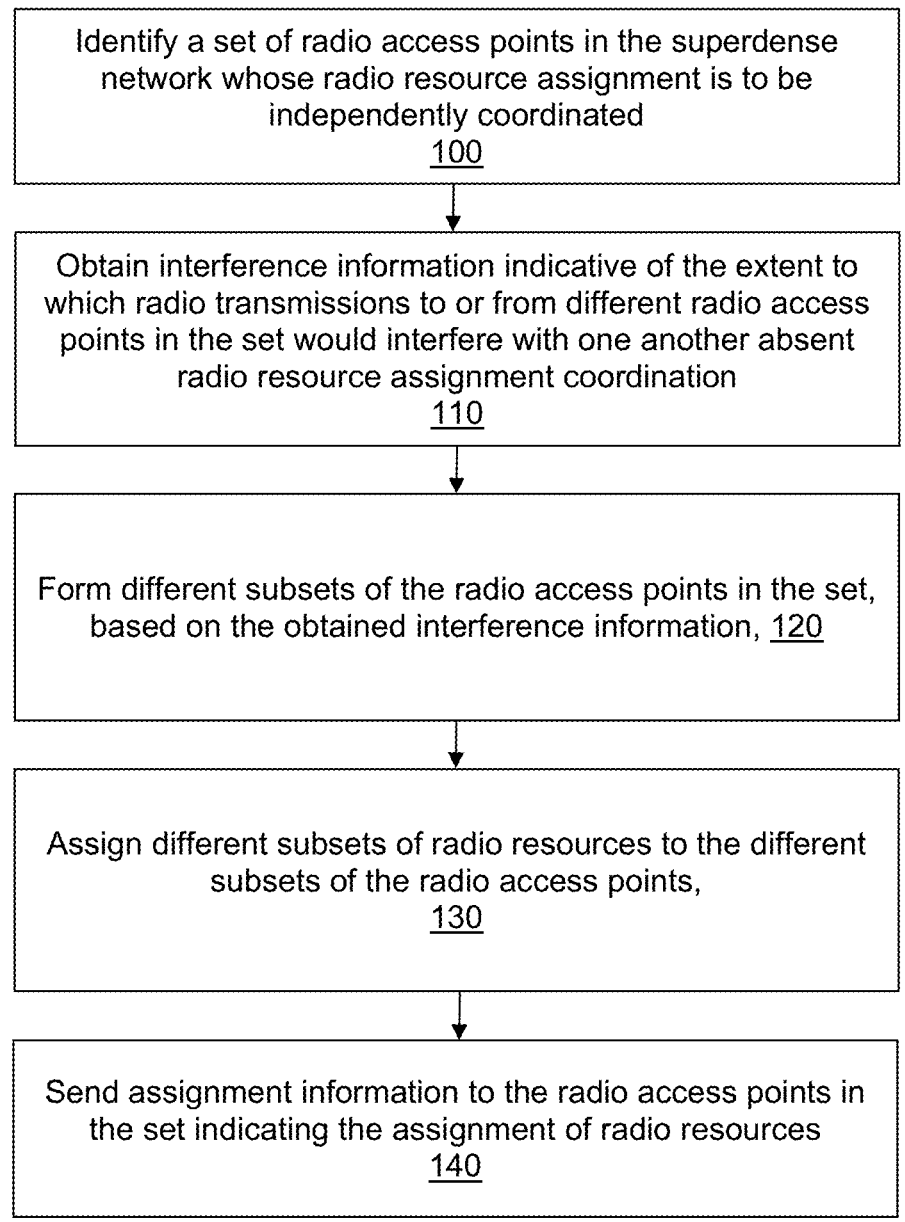
FIG. 1 is a flowchart depicting embodiments of a method in a network controller node.

One or more embodiments herein employ a simple, although non-trivial, clustering and coordination approach to radio resource assignment in a superdense network (SDN) that requires no inter-radio AP communication nor any channel state information other than received signal power and/or link path gain. In this approach, the interference in a SDN is reduced by system imposed isolation using radio resource partitioning in time and/or frequency in areas that do not have natural isolation. Thus, the embodiments make the system noise-limited by coordinating the transmissions from different access points (radio APs) in a simple but non-trivial manner.

Some embodiments provide further simplification by utilizing the inherent isolation between different areas in a network. In one or more embodiments, for example, a network is divided into sets of radio APs that naturally do not interfere with each other, e.g., due to isolating structures such as walls in building, etc. This clustering into sets is particularly effective for SDNs operating in millimeter wave (MMW) frequencies since the penetration loss through various structures is very high at these frequencies. Regardless, the clustering of radio APs is done so that radio transmissions to or from a radio AP in one set causes no, or only weak, interference to any radio transmissions to or from radio APs in other sets (such interference thus encompasses AP-to-terminal interference and terminal-to-AP interference, as well as AP-to-AP interference and terminal-to-terminal interference). Therefore, no coordination is needed between different sets. Examples of division of a SDN network into sets that have natural isolation according to one or more embodiments herein are shown in FIG. 4.

One or more embodiments herein partition radio APs belonging to the same set into subsets that do not interfere with each other. Each set (in some cases the entire network may consist of a single set) is divided into subsets so that the isolation between radio APs within a subset is as high as possible whereas the isolation between radio APs in different subsets can be low. The division of an SDN into sets and the sets into subsets is performed by a network controlling function (e.g., a network controller) based on path gains between different wireless terminals and radio APs, either using explicit path gain or received signal strength values or implicitly using permissible set lists reported from the terminals to the network controlling function, and possibly also on positioning and a priori knowledge about buildings, other structures, or other isolating elements. The subset division may also be performed adaptively on a slower time-scale based on measured interference level and spatial load distribution in the network.

In its simplest embodiment, each subset of radio Aps is allowed to be active in a round-robin fashion. When a subset is scheduled, each radio AP in that subset is allowed to be active but no other radio AP in the set that does not belong to that subset is allowed to be active. In this way interference is reduced since the effective distance (in a path gain sense) to the closest interferer is increased. FIG. 5 shows an illustration of how radio APs in different subsets can be active in different time slots. The decreased interference, compared to the case when all radio APs can be active simultaneously, enables higher link bit rates, which implies that the same system throughput can be attained at a lower activity factor. This in turn, reduces the interference even further.

Depending on the wireless terminal and radio AP density, a wireless terminal may be associated with more than one subset in order to increase the wireless terminal's total active time and, hence, throughput. The following list describes one possible method to associate wireless terminals to subsets:

Each wireless terminal defines a "permissible set" of radio APs where the members of this set are determined from the path gains relative the strongest radio AP e.g. based on reference signal received power (RSRP) measurements, or from the received downlink (DL) signal strengths. The wireless terminal reports to all radio APs in its permissible set that the radio AP is a member of this set.

For every time slot each active radio AP transmits to one of the wireless terminals that have reported that this radio AP is a member of its permissible set. Which wireless terminal to transmit to can be determined from different criteria, such as path gain, signal strength, priority, etc. If no wireless terminal has this radio AP in its permissible set, the radio AP is silent. If more than one radio AP in the active subset is available for communication with the same wireless terminal in the same time slot, only one of those available radio APs is allowed to communicate with the terminal. In some embodiments, this rule is enforced or mediated by the wireless terminal or the network control function (e.g., the network controller), so that inter-radio AP communication is avoided. In other embodiments, of course, the radio APs of the SDN coordinate amongst themselves regarding which radio AP in the subset is to transmit to the wireless terminal in any given time slot, albeit at the expense of inter-radio AP communication. Note that in at least some embodiments the enforcer, mediator, or coordinator of the rule that only one radio AP in the subset is allowed to communicate with the terminal in any given time slot need not have knowledge about the subset division of the radio APs. In other embodiments, though, the radio APs are only listening/receiving part of the time, for example during a time period that is allocated to their respective subsets by the network controller. In this case, the terminals know when they can initiate communication with different APs in their permissible set.

Alternatively, a wireless terminal can send a request to a radio AP in its permissible set and if not acknowledged send a request to the next radio AP in its permissible set and so on until the request is acknowledged by a radio AP of its permissible set.

Embodiments of a method in a network controller will now be described with reference to a flowchart depicted in FIG. 1.

The method is implemented by a network controller 200 for coordinating assignment of radio resources to radio access points in a superdense, SDN, network comprising wireless terminals being served by the radio access points. The method comprises identifying 100 a set of radio access points in the SDN network whose respective radio resource assignment is to be independently coordinated. Broadly, independent coordination in this regard means that the network controller coordinates assigning radio resources to radio access points in the set without regard to the assignment of radio resources to any radio access points outside the set.

The method further comprises obtaining 110 interference information indicative of the extent to which radio transmissions to or from different radio access points in the set would interfere with one another absent radio resource assignment coordination. In some embodiments, this interference information comprises permissible set information from the wireless terminals broadly pertaining to whether or the extent to which any given radio access point is included in the same permissible set as a different radio access point. A permissible set as used herein is a list maintained by each wireless terminal containing the radio APs that are able to establish a link to the terminal with sufficient quality (e.g., a quality above a defined threshold). In other embodiments, the interference information comprises path gain information more specifically pertaining to the path gains between different wireless terminals and radio access points in the superdense network. Alternatively or additionally, the interference information in other embodiments comprises positioning information pertaining to the geographic position of the radio access points in the superdense network, the geographic position of physical objects (e.g., buildings) in the superdense network that provide natural isolation, or the like. In a general sense, then, the interference information broadly indicates the extent to which radio transmissions to or from different radio access points would "naturally" interfere with one another, e.g., given the radio access points' positions relative to one another, any physical objects such as buildings between the radio access points, etc.

The method further comprises forming 120 (i.e., creating or otherwise determining) subsets of the radio access points in the set, based on the obtained interference information. More specifically, the different subsets are formed such that, according to the interference information, radio transmissions to or from radio access points in the same subset would interfere with one another to a lesser extent and radio transmissions to or from radio access points in different subsets would interfere with one another to a larger extent. In other words, radio access points in the same subset would naturally interfere with one another to a lesser extent (or, conversely, the points would be naturally isolated from one another to a greater extent). By contrast, radio access points in different subsets would naturally interfere with one another to a greater extent (or, conversely, the points would be naturally isolated from one another to a lesser extent).

The method further comprises assigning 130 different subsets of radio resources to the different subsets of the radio access points to minimize or at least reduce the extent to which radio transmissions to or from radio access points in different subsets will interfere with one another. In some embodiments, radio resources include time resources, frequency resources, or both. Reducing the extent of interference through radio resource assignment in this way amounts to artificially increasing the isolation between the radio access points in different subsets. In this sense, then, the method in some embodiments forms the different subsets to exploit as much natural isolation as possible between radio access points belonging to the same subset and intelligently assigns radio resources to those subsets to impose as much artificial isolation as possible between radio access points belonging to different subsets.

The method also comprises sending 140 assignment information towards or to the radio access points in the set, indicating the assignment of radio resources. Sending of assignment information in some embodiments, for example, involves transmitting the assignment information as control signaling.

Although the above embodiments are focused on a single set (e.g., group or cluster) of radio access points, other embodiments herein involve multiple sets, where the above method of FIG. 1 is performed independently for each set. In this regard, identifying any given set entails distinguishing the set of radio access points from a different set of radio access points in the superdense network. Radio resource assignments to radio access points in one set is to be coordinated independently from radio resource assignment to radio access points in another set.

Expanding upon these other embodiments, therefore, the method performed by the network controller may then optionally further include obtaining interference information indicative of the extent to which radio transmissions to or from radio access points in multiple sets would interfere with one another absent radio resource assignment coordination. Moreover, the method then entails determining, based on the obtained interference information that the extent of interference between radio transmissions to or from any given radio access point in one set and radio transmissions to or from any given radio access point in a different set would be below a defined threshold. Such determination amounts to identifying that the radio access points in different sets are substantially naturally isolated from one another, meaning that no coordination need take place across the different sets with regard to radio resource assignment.

In some embodiments, the subsets herein are mutually exclusive, meaning that they are disjoint from one another. That is, a radio access point is not included in more than one subset. In other embodiments, however, the subsets herein are not disjoint, meaning that at least one radio access point is included in more than one subset. In this case, for example, consider a situation where a radio AP A could be associated with one or more "secondary subsets" in addition to a "primary subset" when the activity (traffic load) on radio APs in the "secondary subset(s)" is low, particularly for radio APs close to radio AP A, or when a terminal has high traffic requirements. For instance, this could be advantageous for a terminal which has only one candidate AP with good link performance in its permissible set. Allowing an AP to be associated with a secondary subset will increase the risk of interference, but in low-load situations this may be a non-issue.

In some embodiments, the network controller dynamically adapts one or more criteria based on which the subsets are formed. In one embodiment, for example, these one or more criteria include the extent to which radio transmissions to or from radio access points in the same subset are permitted to (naturally) interfere with one another. In one example, this permitted extent is governed by one or more thresholds indicative of or otherwise associated with interference, meaning that dynamic adaptations involves adaptation of these one or more thresholds. Another example embodiment entails the network controller adapting the one or more criteria by setting or configuring the one or more thresholds indicative of or otherwise associated with the extent of permitted interference. In this or other embodiments, the one or more criteria reflect or otherwise affect the geographic density of the radio access points included in the same subset. For example, dynamically adapting the one or more criteria to permit a greater extent of interference between radio access points in the same subset means that the geographic density of the radio access points in the subset will be increased. Alternatively or additionally, this means that the number of radio access points in the subset will be increased (i.e., the size of the subset will be increased).

In some embodiments, as one example, such dynamic adaptation is performed based on the traffic demand in the superdense network. For instance, responsive to increased traffic demand, the network controller dynamically adjusts the one or more criteria to permit a greater extent of interference between radio access points in the same subset (as compared to before the adjustment). Conversely, responsive to decreased traffic demand, the network controller dynamically adjusts the one or more criteria to permit a lesser extent of interference between radio access points in the same subset. In embodiments where the radio resources assigned include time resources, permitting a greater extent of interference between radio access points in any given subset means that a greater number of access points will be available for serving traffic demand at any given time, albeit at the potential expense of increased interference between access points belonging to the same subset. Conversely, permitting a lesser extent of interference between radio access points in any given subset means that fewer access points are available for serving traffic demand at any given time, but that interference is decreased between access points belonging to the same subset.

Embodiments of a network controller node 200 will now be described with reference to FIG. 2.

The network controller 200 comprises one or more communication interfaces 210 configured to communicatively couple the controller to radio access points in a superdense network. The communication interfaces 210 comprises on or more of transmitters, receivers, transceivers, antenna elements or the like radio hardware or software for enabling radio communication with the radio APs as well as with wireless terminals. The controller further includes one or more processing circuits 220 comprising a set identifying circuit 221 configured to identify a set of radio access points in the SDN network whose respective radio resource assignment is to be independently coordinated.

The controller processing circuit also includes an interference information obtaining circuit 222 configured to obtain interference information indicative of the extent to which radio transmissions to or from different radio access points in the set would interfere with one another absent radio resource assignment coordination.

The controller processing circuit further includes a subset forming circuit 223 configured to form subsets of the radio access points in the set based on the obtained interference information.

The controller processing circuit(s) further includes an assignment circuit 224 configured to assign different subsets of radio resources to the different subsets of the radio access points, and a reporting circuit 225 configured to report assignment information to the radio access points in the set, indicating the assignment of radio resources.

The network controller may further include a memory (not shown) comprising one or more memory units. The memory is arranged to be used to store information and parameters obtained from the radio APs and/or the wireless terminals of the SDN, as well as configurations and applications, to perform the methods herein when being executed in the network controller 200.

In some embodiments, the network controller is a radio network controller, is a certain one of the radio access points designated as a master or controller over the other access points, or is some other network node in the superdense network.

Figure 2:
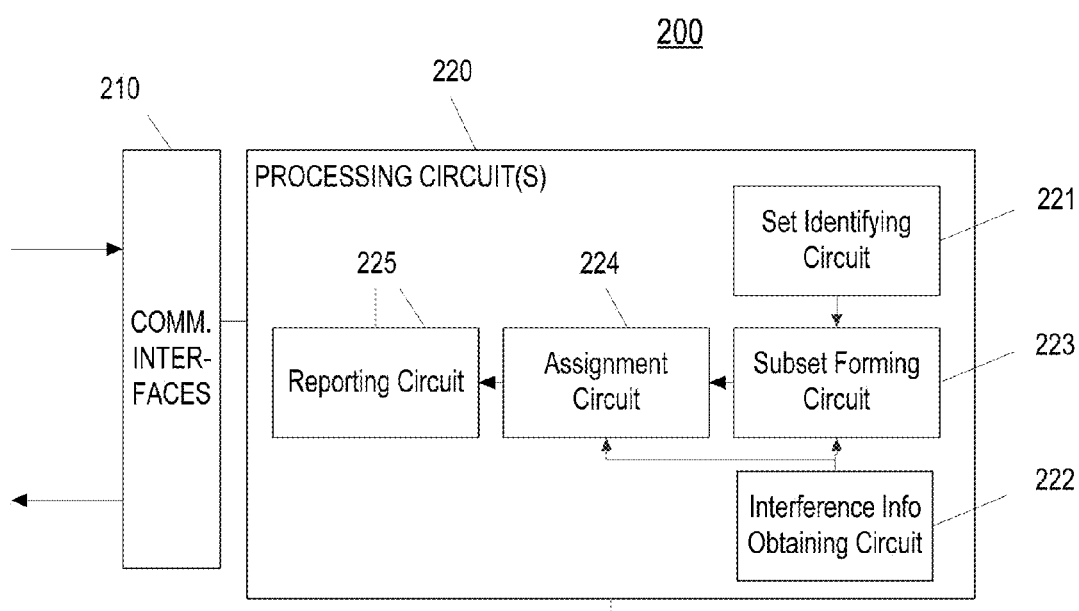
FIG. 2 is a schematic block diagram illustrating embodiments of a network controller.

Those skilled in the art will of course appreciate that FIG. 2 is simply an example, and that the depicted circuits may be realized, implemented, or otherwise configured within the network controller node, based upon the execution of computer program instructions stored in memory or within another computer readable medium in the entity.

Putting the network controller herein described and the SDN in context, FIG. 3 illustrates a wireless communication system according to one or more embodiments. As shown, a core network (CN) communicatively couples a radio access network (RAN) to one or more external networks, such as a public switched telephone network (PSTN), a packet data network (PDN) such as the Internet, or the like. The RAN includes the SDN as described above. The RAN in some embodiments also includes other radio access network deployments, such as macro access point deployments, pico access point deployments, etc. Regardless, the network controller 200 as described above in relation to FIG. 2 herein in some embodiments is included in the CN. In other embodiments, the network controller 200 as described above in relation to FIG. 2 herein is included in the RAN, e.g., in the SDN itself.

A computer readable storage medium is schematically exemplified in FIG. 6 having stored thereon a computer program comprising computer readable code which, when run on at least one processing circuit of a network controller, such as the controller node described above in conjunction with FIG. 2, causes the network controller to perform the method embodiments as described in relation to FIG. 1 above.

The computer readable code or program code mentioned above may also be provided as a computer program product, for instance in the form of a data carrier carrying computer program code for performing the embodiments herein when being loaded into the in the network controller 200. One such carrier may be in the form of a CD ROM disc. It is however feasible with other data carriers such as a memory stick. The computer program code may furthermore be provided as pure program code on a server and downloaded to the network controller 200.

One or more embodiments herein provide reduced interference compared to no coordination. One or more embodiments herein also provide a simpler approach as compared to ICIC. Indeed, no inter-radio AP communication is needed. And only a minimum of communication is needed between radio APs and the network control function. Further, no channel state information other than path gain and/or received signal strength is needed. Still further, one or more embodiments provide simplicity and low cost. Indeed, interference reduction is achieved without affecting radio AP density or complexity per radio AP. Note that the term "subset" is used herein in its general sense to refer to a part or portion of a larger set. This contrasts with the mathematical or technical sense of the term in which a subset may be the same as the set. In mathematical terms, a "subset" as used herein is really a "proper subset."

The circuits discussed above may comprise a processor circuit (consisting of, for example, one or more microprocessors, microcontrollers, digital signal processors, or the like) configured with appropriate software and/or firmware in memory to carry out one or more of the techniques discussed above. The circuits may alternatively be implemented (in whole or in part) by one or more dedicated integrated circuits, such as one or more field-programmable gate arrays (FPGAs) or application-specific integrated circuits (ASICs).

The present invention may, of course, be carried out in other specific ways than those herein set forth without departing from the scope and essential characteristics of the invention. The present embodiments are, therefore, to be considered in all respects as illustrative and not restrictive.

What is claimed is:

1. A method implemented by a network controller for coordinating assignment of radio resources to radio access points in a superdense, SDN, network comprising wireless terminals being served by the radio access points, the method comprising:
    identifying a set of radio access points in the SDN network whose respective radio resource assignment is to be independently coordinated from radio resource assignment to radio access points in another set of radio access points in the SDN network, wherein the sets of radio access points are isolated from one another such that no coordination is needed across the different sets with regard to radio resource assignment;
    obtaining interference information indicative of the extent to which radio transmissions to or from different radio access points in the identified set would interfere with one another without radio resource assignment coordination;
    forming subsets of the radio access points in the identified set, based on the obtained interference information, wherein the forming comprises forming one or more of the subsets to include multiple radio access points, wherein the forming comprises including in a respective subset radio access points whose radio transmissions would interfere with one another to an extent below a threshold, and excluding in the respective subset radio access points whose radio transmissions would interfere with one another to an extent above the threshold, as indicated by the obtained interference information, and wherein radio transmissions to or from radio access points in the same subset would interfere with one another to a lesser extent and radio transmissions to or from radio access points in different subsets would interfere with one another to a larger extent without radio resource assignment coordination, as indicated by the obtained interference information;
    assigning different subsets of radio resources to the different subsets of the radio access points, wherein the same subset of radio resources is assigned to the radio access points within each of the one or more subsets that include multiple radio access points;
    sending assignment information towards the radio access points in the identified set indicating the assignment of radio resources; and
    repeating the obtaining, forming, assigning, and sending for the another set of radio access points, independently of the obtaining, forming, assigning, and sending for the identified set;
    wherein the identifying a set of radio access points comprises obtaining interference information indicative of the extent to which radio transmissions to or from radio access points in multiple sets of radio access points would interfere with one another without radio resource assignment coordination, wherein the multiple sets include the another set of radio access points and the identified set; and
    determining, based on the obtained interference information indicative of the extent to which radio transmissions to or from radio access points in multiple sets of radio access points would interfere with one another without radio resource assignment coordination, that the extent of interference between radio transmissions to or from any given radio access point in the identified set and radio transmissions to or from any given radio access point in the another set would be below a defined threshold.

2. The method according to claim 1, wherein the interference information comprises permissible set information from wireless terminals pertaining to whether or the extent to which any given radio access point is included in the same permissible set as a different radio access point.

3. The method according to claim 2, wherein the permissible set is a list maintained by each wireless terminal containing the radio access points that are able to establish a link to the terminal with a quality above a defined threshold.

4. The method according to claim 1, wherein the interference information comprises information of path gains between different wireless terminals and radio access points in the superdense network.

5. The method according to claim 1, wherein the interference information comprises positioning information pertaining to the geographic position of the radio access points in the superdense network or the geographic position of physical objects in the superdense network that provide isolation.

6. The method according to claim 1, wherein the radio resources include time resources, frequency resources, or both.

7. The method according to claim 1, wherein the sending of assignment information comprises transmitting the assignment information as control signaling.

8. The method according to claim 1, wherein the determining comprises identifying that the radio access points in different sets are isolated from one another to an extent such that no coordination is needed across the different sets with regard to radio resource assignment.

9. The method according to claim 1, wherein the subsets are formed mutually exclusive such that they are disjoint from one another.

10. The method according to claim 1, wherein the subsets are formed not disjoint from one another such that at least one radio access point is included in more than one subset.

11. The method according to claim 1, further comprising the network controller dynamically adapting one or more criteria based on which the subsets are formed, wherein the dynamic adaptation is performed based on the traffic demand in the superdense network.

12. The method according to claim 11, wherein the one or more criteria include one or more thresholds indicating the extent to which radio transmissions to or from radio access points in the same subset are permitted to interfere with one another.

13. The method according to claim 12, further comprising setting the one or more thresholds indicative of or otherwise associated with the extent of permitted interference such that the dynamic adaptations involves adaptation of these one or more thresholds.

14. The method according to claim 11, wherein the one or more criteria are associated with the geographic density of the radio access points included in the same subset.

15. The method of claim 1, wherein the assigning comprises assigning different time resources to the different subsets of the radio access points.

16. The method of claim 15, wherein the assigning comprises assigning the same frequency resources to the different subsets of the radio access points.

17. The method of claim 1, wherein the SDN network is an indoor network with floors and/or walls isolating the sets of radio access points from one another.

18. The method of claim 1, wherein the assigning comprises coordinating, among at least two subsets, access point transmission to a same wireless terminal of the wireless terminals.

19. A network controller comprising one or more communication interfaces configured to communicatively couple the controller to radio access points in a superdense, SDN, network, wherein the network controller further includes a processor and a memory, the memory containing instructions executable by the processor whereby the network controller is configured to:

identify a set of radio access points in the SDN network whose respective radio resource assignment is to be independently coordinated from radio resource assignment to radio access points in another set of radio access points in the SDN network, wherein the sets of radio access points are isolated from one another to an extent such that no coordination is needed across the different sets with regard to radio resource assignment;

obtain interference information indicative of the extent to which radio transmissions to or from different radio access points in the identified set would interfere with one another without radio resource assignment coordination;

form subsets of the radio access points in the identified set based on the obtained interference information, wherein one or more of the subsets are formed to include multiple radio access points, wherein each of the formed subsets are formed to include in a respective subset radio access points whose radio transmissions would interfere with one another to an extent below a threshold, and exclude in the respective subset radio access points whose radio transmissions would interfere with one another to an extent above the threshold, as indicated by the obtained interference information, and wherein radio transmissions to or from radio access points in the same subset would interfere with one another to a lesser extent and radio transmissions to or from radio access points in different subsets would interfere with one another to a larger extent without radio resource assignment coordination, as indicated by the obtained interference information;

assign different subsets of radio resources to the different subsets of the radio access points, wherein the same subset of radio resources is assigned to the radio access points within each of the one or more subsets that include multiple radio access points;

report assignment information to the radio access points in the identified set, indicating the assignment of radio resources; and repeat the obtain, form, assign, and report for the another set of radio access points, independently of the obtain, form, assign, and report for the identified set;

wherein the network controller is configured to identify a set of radio access points by obtaining interference information indicative of the extent to which radio transmissions to or from radio access points in multiple sets of radio access points would interfere with one another without radio resource assignment coordination, wherein the multiple sets include the another set of radio access points and the identified set; and determining, based on the obtained interference information indicative of the extent to which radio transmissions to or from radio access points in multiple sets of radio access points would interfere with one another without radio resource assignment coordination, that the extent of interference between radio transmissions to or from any given radio access point in the identified set and radio transmissions to or from any given radio access point in the another set would be below a defined threshold.

20. The network controller according to claim 19, wherein the network controller is a radio network controller, is a certain one of the radio access points designated as a master or controller over the other access points, or is some other network node in the superdense network.

21. The network controller of claim 19, wherein the radio resources include time resources, frequency resources, or both.

22. The network controller of claim 19, wherein the memory contains instructions executable by the processor whereby the network controller is configured to dynamically adapt one or more criteria based on which subsets are formed, wherein the dynamic adaptation is performed based on the traffic demand in the superdense network.

23. The network controller of claim 22, wherein the one or more criteria are associated with the geographic density of the radio access points included in the same subset.

24. A wireless communication system comprising a core network, CN, communicatively coupling a radio access network, RAN, to one or more external networks, wherein either the CN or the RAN includes a radio network controller, the radio network controller comprising one or more communication interfaces configured to communicatively couple the controller to radio access points in a superdense, SDN, network, wherein the radio network controller further includes a processor and a memory, the memory containing instructions executable by the processor whereby the radio network controller is configured to:
  identify a set of radio access points in the SDN network whose respective radio resource assignment is to be independently coordinated from radio resource assignment to radio access points in another set of radio access points in the SDN network, wherein the sets of radio access points are isolated from one another to an extent such that no coordination is needed across the different sets with regard to radio resource assignment;
  obtain interference information indicative of the extent to which radio transmissions to or from different radio access points in the identified set would interfere with one another without radio resource assignment coordination;
  form subsets of the radio access points in the identified set based on the obtained interference information, wherein one or more of the subsets are formed to include multiple radio access points, wherein each of the formed subsets are formed to include in a respective subset radio access points whose radio transmissions would interfere with one another to an extent below a threshold, and exclude in the respective subset radio access points whose radio transmissions would interfere with one another to an extent above the threshold, as indicated by the obtained interference information, and wherein radio transmissions to or from radio access points in the same subset would interfere with one another to a lesser extent and radio transmissions to or from radio access points in different subsets would interfere with one another to a larger extent without radio resource assignment coordination, as indicated by the obtained interference information;
  assign different subsets of radio resources to the different subsets of the radio access points, wherein the same subset of radio resources is assigned to the radio access points within each of the one or more subsets that include multiple radio access points;
  report assignment information to the radio access points in the identified set, indicating the assignment of radio resources; and
  repeat the obtain, form, assign, and report for the another set of radio access points, independently of the obtain, form, assign, and report for the identified set;
  wherein the radio network controller is configured to identify a set of radio access points by obtaining interference information indicative of the extent to which radio transmissions to or from radio access points in multiple sets of radio access points would interfere with one another without radio resource assignment coordination, wherein the multiple sets include the another set of radio access points and the identified set; and
  determining, based on the obtained interference information indicative of the extent to which radio transmissions to or from radio access points in multiple sets of radio access points would interfere with one another without radio resource assignment coordination, that the extent of interference between radio transmissions to or from any given radio access point in the identified set and radio transmissions to or from any given radio access point in the another set would be below a defined threshold.

25. A computer program product stored on a non-transitory computer-readable medium and comprising computer-readable code which, when run on at least one processing circuit of a network controller, causes the network controller to coordinate assignment of radio resources to radio access points in a superdense, SDN, network comprising wireless terminals being served by the radio access points, the computer-readable code causing the network controller to:
  obtain interference information indicative of the extent to which radio transmissions to or from different radio access points in the SDN network would interfere with one another without radio resource assignment coordination;
  identify, based on the obtained interference information and from the different radio access points, a set of radio access points in the SDN network whose respective radio resource assignment is to be independently coordinated from radio resource assignment to radio access points in another set of radio access points in the SDN network, wherein the sets of radio access points are isolated from one another such that no coordination is needed across the different sets with regard to radio resource assignment;
  form subsets of the radio access points in the identified set, based on the obtained interference information, wherein one or more of the subsets are formed to include multiple radio access points, wherein each of the formed subsets are formed to include in a respective subset radio access points whose radio transmissions would interfere with one another to an extent below a threshold, and exclude in the respective subset radio access points whose radio transmissions would interfere with one another to an extent above the threshold, as indicated by the obtained interference information, and wherein radio transmissions to or from radio access points in the same subset would interfere with one another to a lesser extent and radio transmissions to or from radio access points in different subsets would interfere with one another to a larger extent without radio resource assignment coordination, as indicated by the obtained interference information;

assign different subsets of radio resources to the different subsets of the radio access points, wherein the same subset of radio resources is assigned to the radio access points within each of the one or more subsets that include multiple radio access points;

send assignment information towards the radio access points in the identified set indicating the assignment of radio resources; and repeat the obtain, form, assign, and send for the another set of radio access points, independently of the obtain, form, assign, and send for the identified set;

wherein the network controller is configured to identify a set of radio access points by obtaining interference information indicative of the extent to which radio transmissions to or from radio access points in multiple sets of radio access points would interfere with one another without radio resource assignment coordination, wherein the multiple sets include the another set of radio access points and the identified set; and determining, based on the obtained interference information indicative of the extent to which radio transmissions to or from radio access points in multiple sets of radio access points would interfere with one another without radio resource assignment coordination, that the extent of interference between radio transmissions to or from any given radio access point in the identified set and radio transmissions to or from any given radio access point in the another set would be below a defined threshold.

* * * * *